United States Patent
Hawkins et al.

(10) Patent No.: US 6,295,372 B1
(45) Date of Patent: *Sep. 25, 2001

(54) METHOD AND APPARATUS FOR HANDWRITING INPUT ON A PEN BASED PALMTOP COMPUTING DEVICE

(75) Inventors: Jeffrey C. Hawkins, Redwood City; Robert Yuji Haitani, Cupertino, both of CA (US)

(73) Assignee: Palm, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/805,453

(22) Filed: Feb. 25, 1997

Related U.S. Application Data

(63) Continuation of application No. 08/398,141, filed on Mar. 3, 1995, now abandoned.

(51) Int. Cl.[7] .................................................. G06K 9/00
(52) U.S. Cl. ................................... 382/187; 345/156
(58) Field of Search .................................. 382/187, 188, 382/189, 181, 182, 186; 178/18–20, 18.01, 18.03, 18.1; 345/204–205, 1–5, 358, 112, 113, 156, 180–184, 173; 395/148; 708/140

(56) References Cited

U.S. PATENT DOCUMENTS

| | | | |
|---|---|---|---|
| 4,531,231 | 7/1985 | Crane et al. | 382/13 |
| 4,730,186 * | 3/1988 | Koga et al. | 345/179 |
| 4,860,372 * | 8/1989 | Kuzunuki et al. | 382/189 |
| 4,972,496 * | 11/1990 | Sklarew | 382/187 |
| 5,157,737 | 10/1992 | Sklarew | 382/187 |
| 5,159,321 * | 10/1992 | Masaki et al. | 345/179 |
| 5,191,622 | 3/1993 | Shojima et al. | 382/13 |
| 5,231,381 * | 7/1993 | Duwaer | 178/18.03 |
| 5,274,198 * | 12/1993 | Landmeier | 178/18 |
| 5,305,394 * | 4/1994 | Tanaka | 382/18 |
| 5,389,745 * | 2/1995 | Sakamoto | 178/18 |
| 5,410,612 * | 4/1995 | Arai et al. | 382/187 |
| 5,434,929 * | 7/1995 | Beernink et al. | 382/187 |
| 5,444,192 * | 8/1995 | Shetye et al. | 178/18 |
| 5,452,371 * | 9/1995 | Bozinovic | 382/187 |
| 5,459,796 * | 10/1995 | Boyer | 382/187 |
| 5,523,775 * | 6/1996 | Capps | 178/18 |
| 5,528,743 * | 6/1996 | Tou et al. | 395/148 |
| 5,534,892 * | 7/1996 | Tagawa | 345/173 |
| 5,615,284 * | 3/1997 | Fhyne et al. | 382/187 |
| 5,621,817 * | 4/1997 | Bozinovic et al. | 382/189 |
| 5,644,628 * | 7/1997 | Schwarzer et al. | 178/18.01 |
| 5,666,139 * | 9/1997 | Thielens et al. | 382/189 |
| 5,666,438 * | 9/1997 | Beernink et al. | 382/187 |
| 5,698,822 * | 12/1997 | Haneda et al. | 345/179 |
| 5,841,901 * | 11/1998 | Arai et al. | 382/187 |

OTHER PUBLICATIONS

Microsoft Corporation Users Guide entitled: Microsoft Windows for PenComputing, Version 1.0, 1992, Grid, pp. 1–43.

Casio Computer Co., Ltd. Users Guide entitled: Z–7000 Personal Digital Assistant, pp. 25–33.

(List continued on next page.)

Primary Examiner—Jayanti K. Patel
(74) Attorney, Agent, or Firm—Van Mahamedi; Hickman Palermo Truong & Becker LLP

(57) ABSTRACT

A pen-based palmtop computer system having a small dedicated text input area is disclosed. In one embodiment, the dedicated text input area consists of a large digitizer pad laid on top of a smaller flat panel display screen such that a portion of the digitizer pad extends beyond the flat panel display screen. In this embodiment, the dedicated text input area is located in the region of the digitizer pad that extends beyond the flat panel display screen. Text can be entered by handwriting in the small dedicated text input area or tapping keys on an illustrated keypad.

9 Claims, 8 Drawing Sheets

OTHER PUBLICATIONS

Newton Users Guide entitled: MessagePad Handbook, Apple Computer, Inc., Chap. 2, pp. 5–39, 1993.

Newton Users Guide entitled: MessagePad 100 Setup and Handwriting Guide, Apple Computer, Inc., Chap. 2, pp. 11–26, 1994.

Zaurus Users Guide PI–3000, Sharp, pp. 288–289.

PalmTop PTC–300/310 Users Guide, Sony, pp. 140–153, 1991.

Xtend PN10 Users Guide, Toshiba, pp. 35–73, 1993.

Article: "touch–Typing with a Stylus", by David Goldberg and Cate Richardson, (9) pages total.

References generally related to Palmtops, (20) pages total.

Xerox patents relating to handwriting recognition, (5) pages total.

\* cited by examiner

METHOD AND APPARATUS FOR HANDWRITING INPUT ON A PEN BASED PALMTOP COMPUTING DEVICE

This is a continuation of application Ser. No. 08/398,141 filed Mar. 3, 1995 now abandoned.

FIELD OF THE INVENTION

The present invention relates to the field of palmtop computer devices. Specifically, the present invention discloses a palmtop computer system that efficiently reduces the handwriting input area and maximizes the display screen area.

BACKGROUND OF THE INVENTION

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used as addressbooks, daily organizers, and electronic notepads.

Since palmtop computer systems are so small, keyboards are generally not efficient input devices. Palmtop computers with keyboards have keyboards that are so small that a user cannot touch-type. Furthermore, to use a keyboard a user must usually put the palmtop computer system down onto a flat surface so the user can type.

Instead of using a keyboard, many palmtop computers employ a pen and a digitizer pad as an input system. The pen and digitizer pad combination works well for palmtop computers since the arrangement allows a user to hold the palmtop computer system in one hand while writing onto the digitizer pad with the other hand.

There have been a number of palmtop computer systems introduced that rely on the pen and digitizer pad combination as the primary means of interfacing with the computer system. Most of these pen-based palmtop computer systems provide handwriting recognition whereby the user can write words and letters on the digitizer pad and the palmtop computer system converts the user's handwriting into a machine readable format. Examples of pen-based palmtop computer systems that provide handwriting recognition include the Apple® Newton® and the Tandy® Zoomer™.

One of the major difficulties in designing a pen-based palmtop computer system is that handwriting recognition requires a large area in which to write. Although a user can comfortably view text on a computer screen displayed in a relatively small font, most users require a much larger surface area in order to write with a pen on a digitizer pad. A larger area is required for writing since digitizer pads are not extremely accurate and the resolution of most flat panel display devices is not great enough to display small ink patterns. However, a competing goal for palmtop computer systems is that users want the systems to be very small for portability. Thus, it would be desirable to design a palmtop computer system that minimizes the amount of surface area required for a handwriting area such that the amount of area on a small palmtop computer system used for the display screen is maximized.

SUMMARY AND OBJECTS OF THE INVENTION

It is therefore an object of the present invention to design a pen-based computer system that minimizes the amount of surface area required for handwriting input such that the display screen area is maximized.

It is a further object of the present invention to design a small pen-based palmtop computer system that can be built at minimal cost.

It is yet a further object of the present invention to design a pen-based computer system that will sustain less damage by long term pen usage.

These and other objects, features and advantages of the present invention will be apparent from the detailed description that follows below and from the accompanying drawings. A pen-based palmtop computer system is disclosed. The pen-based palmtop computer system has a small dedicated text input area. In one embodiment, the dedicated text input area consists of a large digitizer pad laid on top of a smaller flat panel display screen such that a portion of the digitizer pad extends beyond the flat panel display screen. In this embodiment, the dedicated text input area is located in the region of the digitizer pad that extends beyond the flat panel display screen. Text can be entered by handwriting in the small dedicated text input area or tapping keys on an illustrated keypad.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for implementing a pen-based computer system with a small handwriting input area are disclosed. In the following description, for purposes of explanation, specific nomenclature is set forth to provide a thorough understanding of the present invention. However, it will be apparent to one skilled in the art that these specific details are not required to practice the present invention. In other instances, well-known circuits and devices are shown in block diagram form to avoid obscuring the present invention unnecessarily.

Palmtop computer systems are designed to be small enough to hold in one hand. Thus, palmtop computer systems can only have small screen displays. To efficiently use the small screen display, most designers of pen-based palmtop computer systems have designed their products to provide an enlarged handwriting area only when necessary to input handwriting but otherwise output text onto the display screen at the smallest size comfortable for reading. The existing palmtop computer systems have employed four methods of providing the enlarged handwriting input areas: 1) Permanent Large Fields; 2) Temporary Large Fields; 3) Floating Writing Box or Keyboard; or 4) Tiled Writing Box or Keyboard. Each technique has certain advantages as disadvantages as described below.

1) Permanent Large Fields

Figure 1:
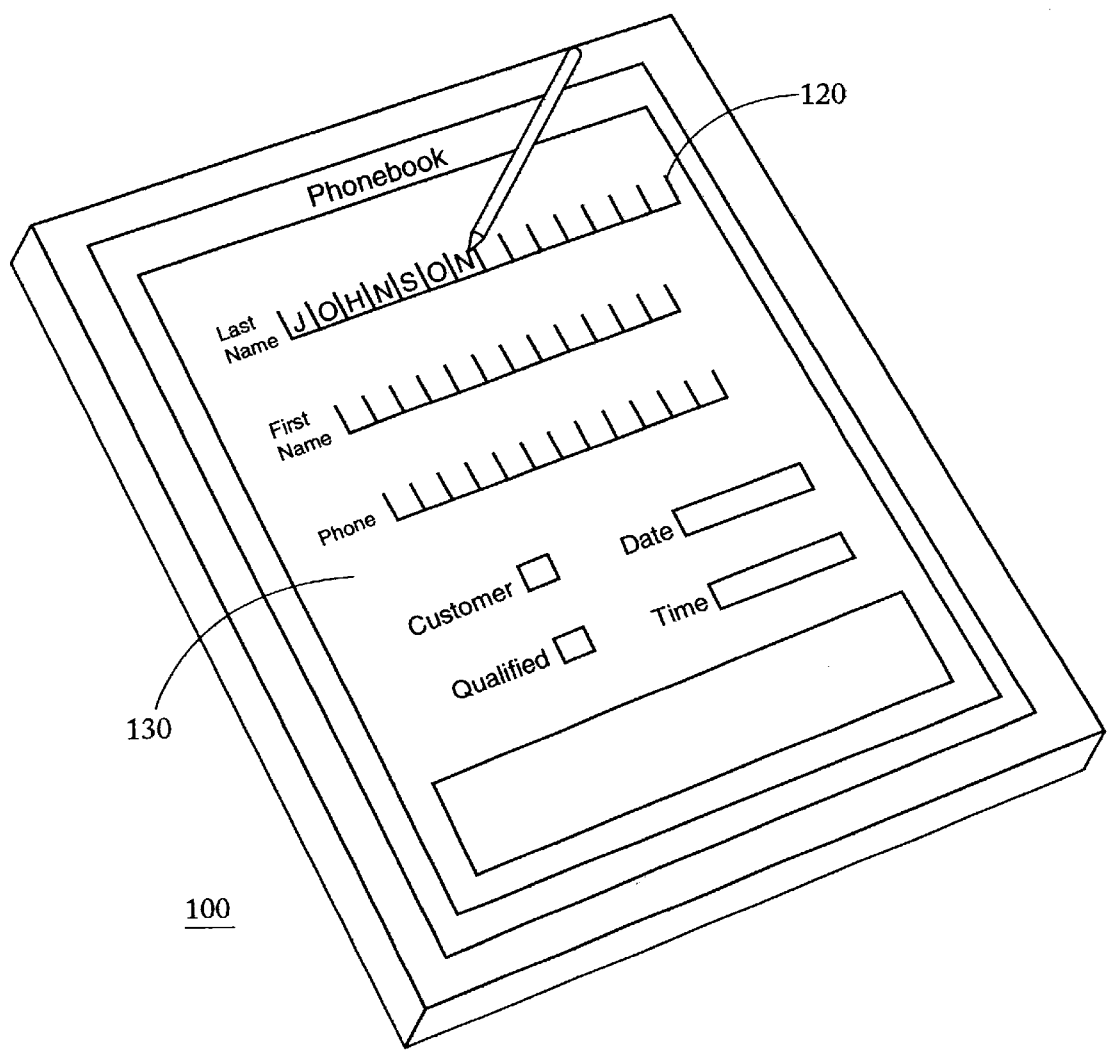
FIG. 1 illustrates a pen-based computer system that uses a large permanent input field for handwriting input.

Some pen-based computer systems display large handwriting input fields where handwritten text must be entered. FIG. 1 illustrates an example of this technique. In FIG. 1, a phone book entry form 120 is displayed on the screen and the name and phone number input fields are large enough to write in. Typically the rest of the data 130 is displayed at a smaller size suitable for viewing only. The advantage of this method is that the user can write directly into the field. However, the major downside of this approach is that the large handwriting input field permanently occupies valuable display screen space thus limiting the number of input fields and other data that can be displayed simultaneously on the display screen. For most applications, a large permanent input field method is only practical on computers with relatively large displays such as the tablet sized computer of FIG. 1 or a notebook computer equipped with a pen. For small palmtop computer systems designed to be held in one hand, large permanent input fields are usually impractical.

2) Temporary Large Fields

Figure 2A:
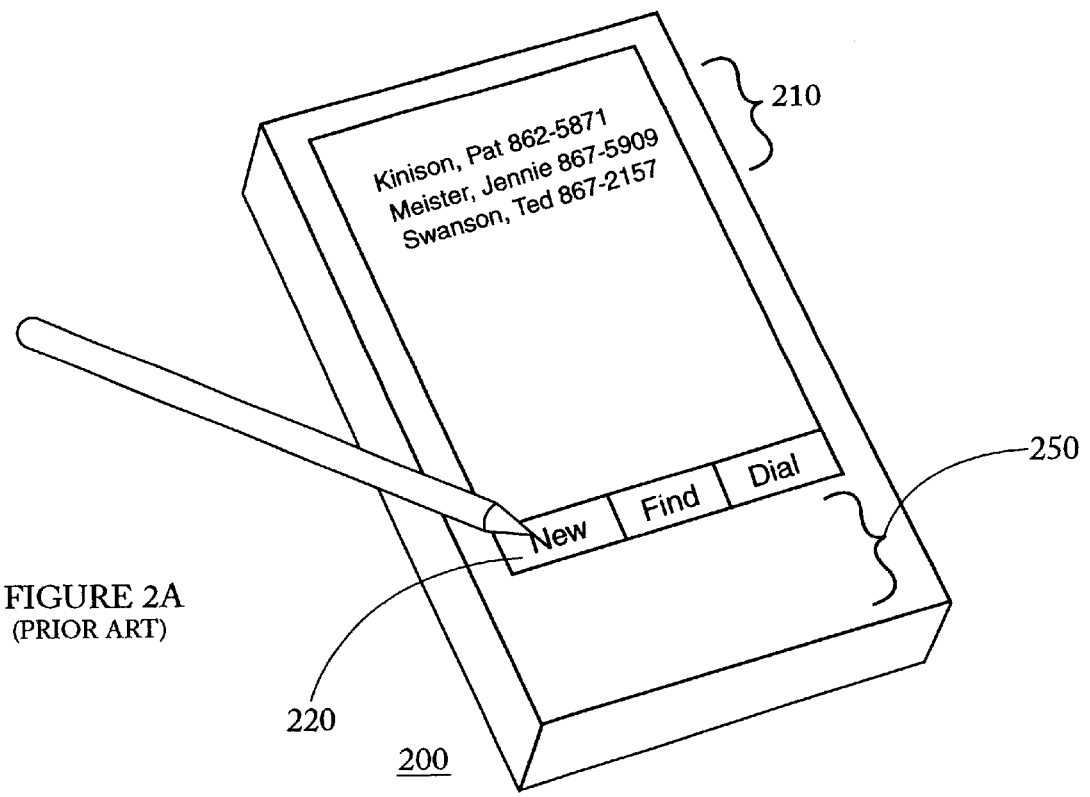
FIGS. 2a and 2b illustrate a pen-based computer system that uses a large temporary input field for handwriting input.
Figure 2B:
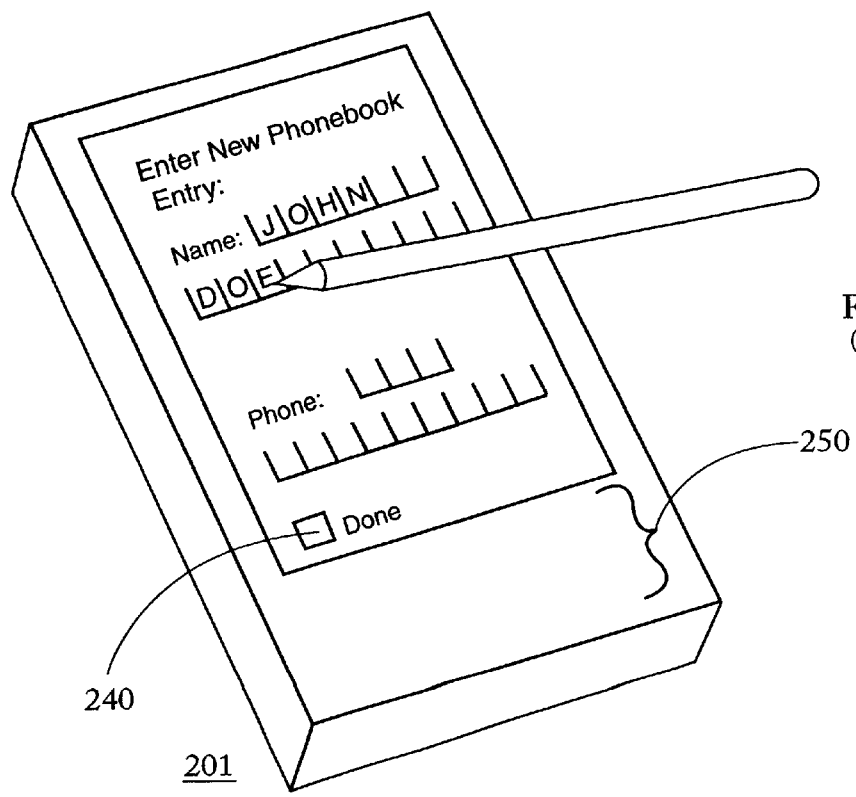

The Temporary Large Fields method is similar to the Permanent Large Fields method except that the handwriting input field is only displayed when it is needed. FIGS. 2a and 2b illustrate an example of the Temporary Large Field technique. Referring to FIG. 2a, the output text fields 210 of a phone book program are normally displayed in a small font for viewing. When a user wishes to enter a new person into the phone book, the user selects an entry button ("New" box 220 in FIG. 2a). The program then expands a large handwriting input field as illustrated in FIG. 2b. The user writes in the enlarged handwriting input field to enter the new information. When done writing, the user selects a done button 240 and the handwriting input field collapses back to the smaller size for viewing. One downside of this approach is that when a handwriting input field expands, other data on the screen must be moved or covered to accommodate the new handwriting input field. This step can be disorientating to the user. Another disadvantage is that the user must perform extra steps to expand and collapse the handwriting input field. Finally, this and the previous method only work for field oriented text. They are not easily adaptable to editing larger blocks of multi-line text typically needed for notes and correspondence.

3) Floating Writing Box or Keyboard

Figure 3:
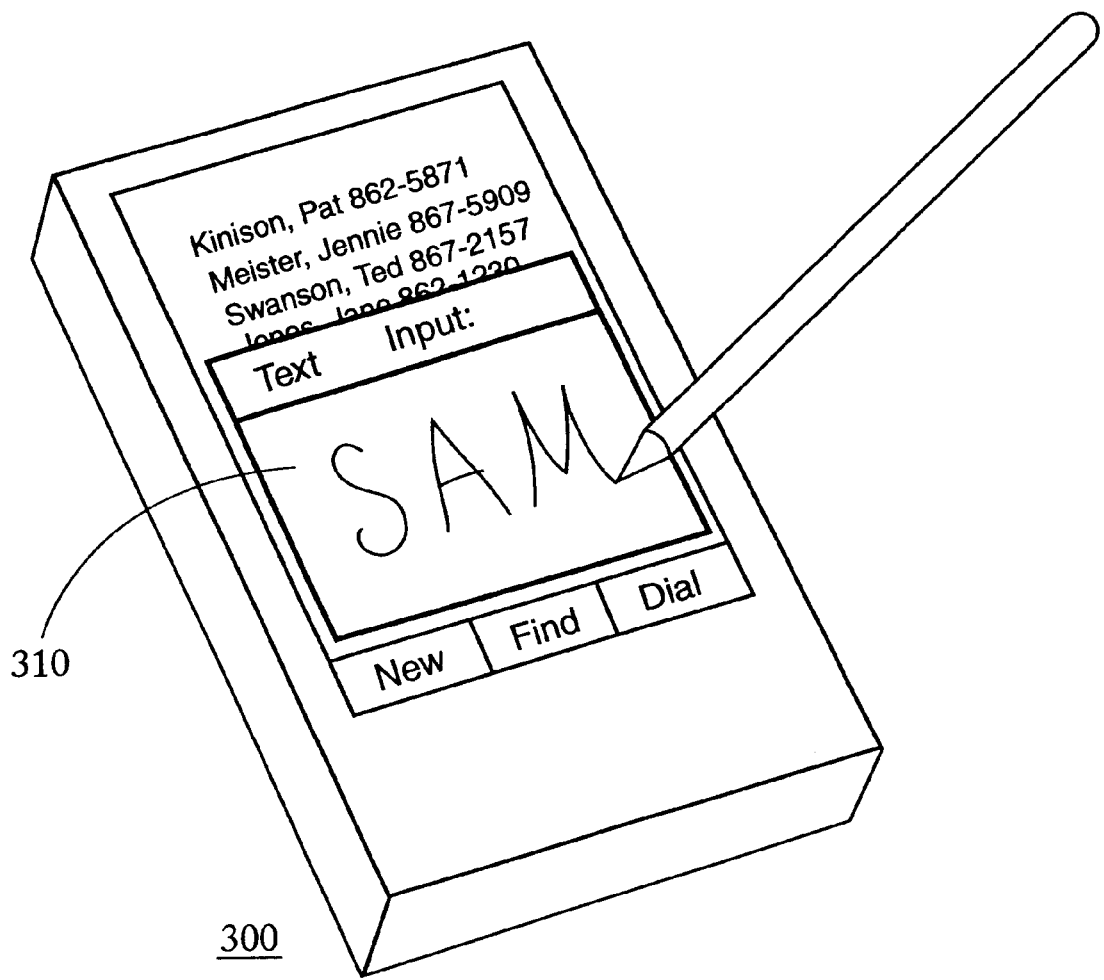
FIG. 3 illustrates a pen-based computer system that uses a floating input box for handwriting input.

A third method of providing an enlarged handwriting input area employs a floating box on the screen for entering handwritten text. FIG. 3 illustrates an example of the floating box technique. As illustrated in FIG. 3, the floating handwriting input box 310 is displayed above the base application and obscures part of the base application. The floating input box 310 can be moved around on the screen such that the user can view any obscured text. The floating input box 310 may contain a field for handwriting in or alternately a picture of a keyboard. When the user writes in the box (or presses one of the on-screen keys of an illustrated keyboard) equivalent characters are passed to the underlying application. The floating input box method has the advantage of working with existing keyboard based applications without modifying the existing application for pen-based input. However, the floating input box method has several disadvantages, most notably is the fact that the floating input box 310 obscures part of the application. To see what is underneath the floating input box 310, the user must reposition the box. The obscuring problem gets worse the smaller the screen display is. Another problem with this method is that the user must perform several steps when inputting text: position the text insertion point, display the floating input box, move the floating input box, and close the floating input box.

4) Tiled Writing Box or Keyboard

Figure 4A:
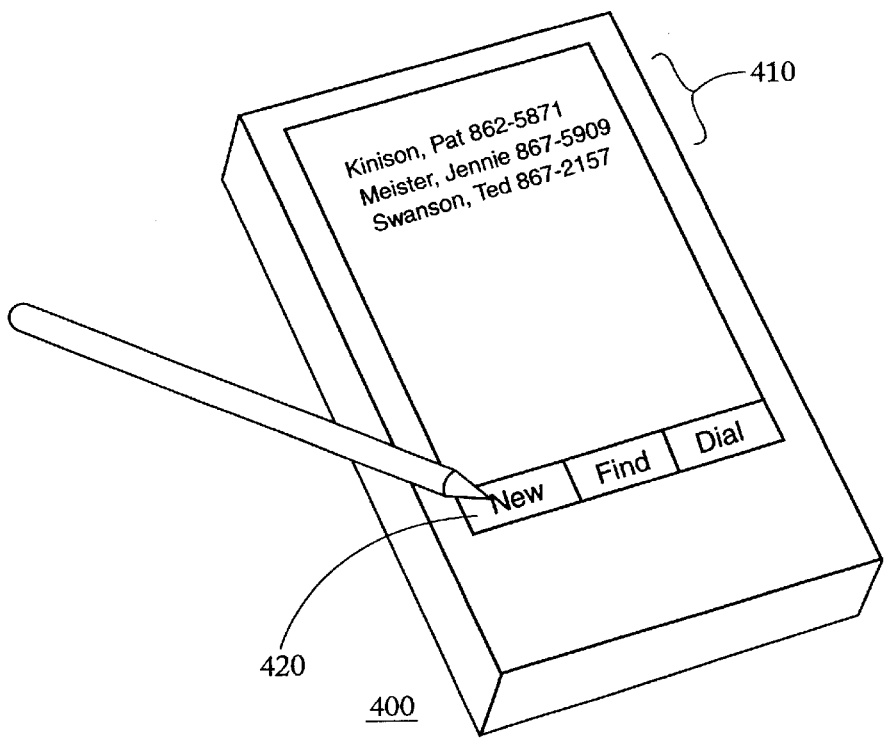
FIGS. 4a and 4b illustrate a pen-based computer system that uses a tiled input box for handwriting input.
Figure 4B:
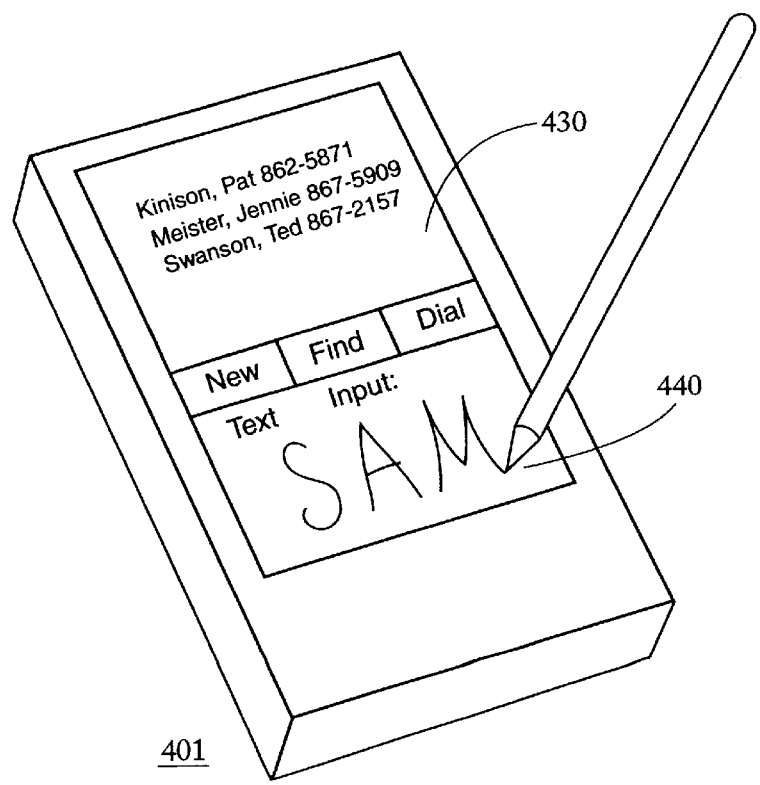

The last method also creates an input box or virtual keyboard but instead of a floating box above the application, the input box is displayed in a fixed location on the display screen. FIGS. 4a and 4b illustrate the tiled input box technique. As illustrated in FIG. 4a, to open the tiled input box, the user selects a button 420 that requests text input. As illustrated in FIG. 4b, the currently running application then resizes itself smaller such that it displays all its data without overlapping a newly created input box 440. In computer terms, the resized application 430 and the adjacent input box 440 are "tiled." This method maximizes the amount of data displayed on the screen when not entering text, and it never obscures any of the application when entering text. One disadvantage of this method is that all applications must be capable of automatically resizing to accommodate the input box 440. Furthermore, the resizing causes confusion this causes to the user when data is automatically moved on the display.

All existing pen-based computer operating systems use one of more of these four methods to provide at area for inputting handwritten text. The following list contains the major vendors of pen-based software and the handwriting text input methods used:

| Manufacturer & pen-based software | Text input method(s) |
|---|---|
| Apple Computer, Newton OS: | 2 & 3 |
| General Magic, MagicCap: | 3 & 4 |
| GeoWorks, Geos: | 1, 2 & 3 |
| Microsoft, Windows for Pen Computing: | 1, 2 & 3 |
| Palm Computing, Graffiti: | 3 |
| Sharp Corporation, Zaurus (Japanese model) | 4 |
| Telxon Corporation, PenRight! | 1, 2 & 3 |

All the currently employed handwriting text input methods have the shortcomings as described above. The most notable problem is that the handwriting input area requires valuable display screen space. The problems with the existing handwriting input methods are exacerbated when the display screen becomes smaller. Since one of the problems in achieving consumer acceptance of palmtop computer systems is that the existing palmtop systems are still too large, a new text entry solution is needed to design smaller palmtop computer systems.

A Pen-based Computer System With A Dedicated Handwriting Area

To cure the problems found in existing pen-based computer systems, a new type of handwriting input technique needed to be employed. An ideal design would meet the achieve the following objectives:

Display all text at the best size for viewing, even while editing;

Work on any size display screen, even very small displays;

Not obscure any displayed data while entering text;

Not cause any redrawing or resizing of applications; and

Allow handwritten text to be entered immediately without any extra steps from the user.

The present invention introduces an improved method of designing a pen-based palmtop computer system that meets all these objectives. The present invention meets the above objectives by introducing the concept of a small dedicated writing area that is located in close proximity to the display. In a preferred embodiment, the dedicated writing area comprises an area of digitizer pad that extends beyond the active area of the flat panel display.

Figure 5A:
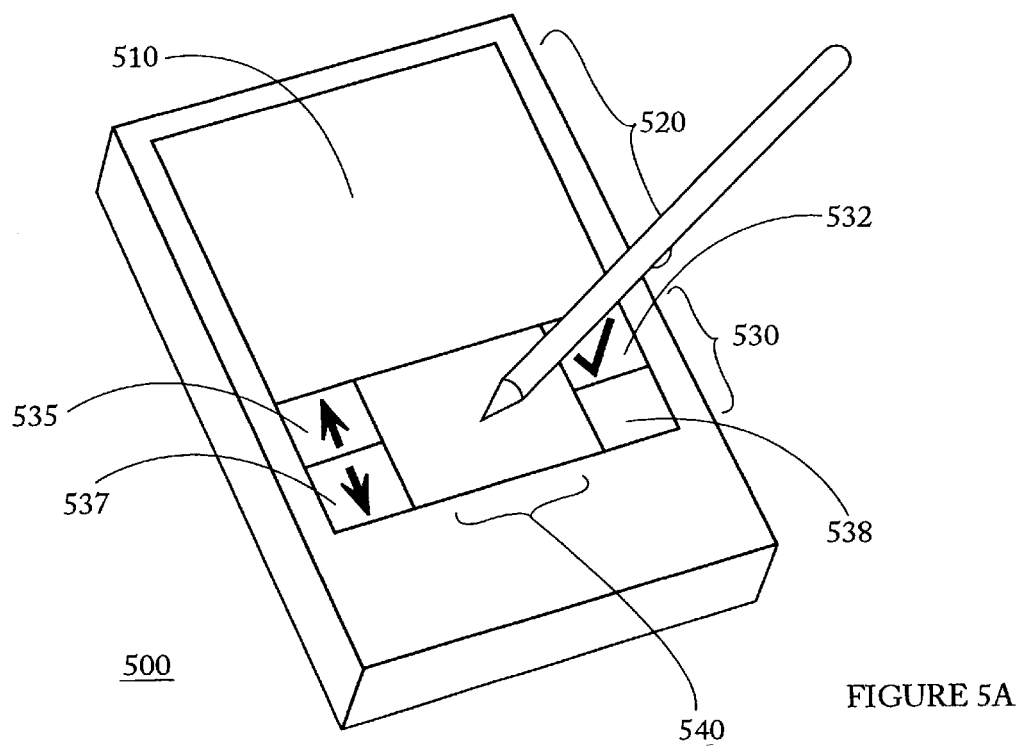
FIGS. 5a and 5b illustrate a first embodiment of the pen-based computer system of the present invention.
Figure 5B:
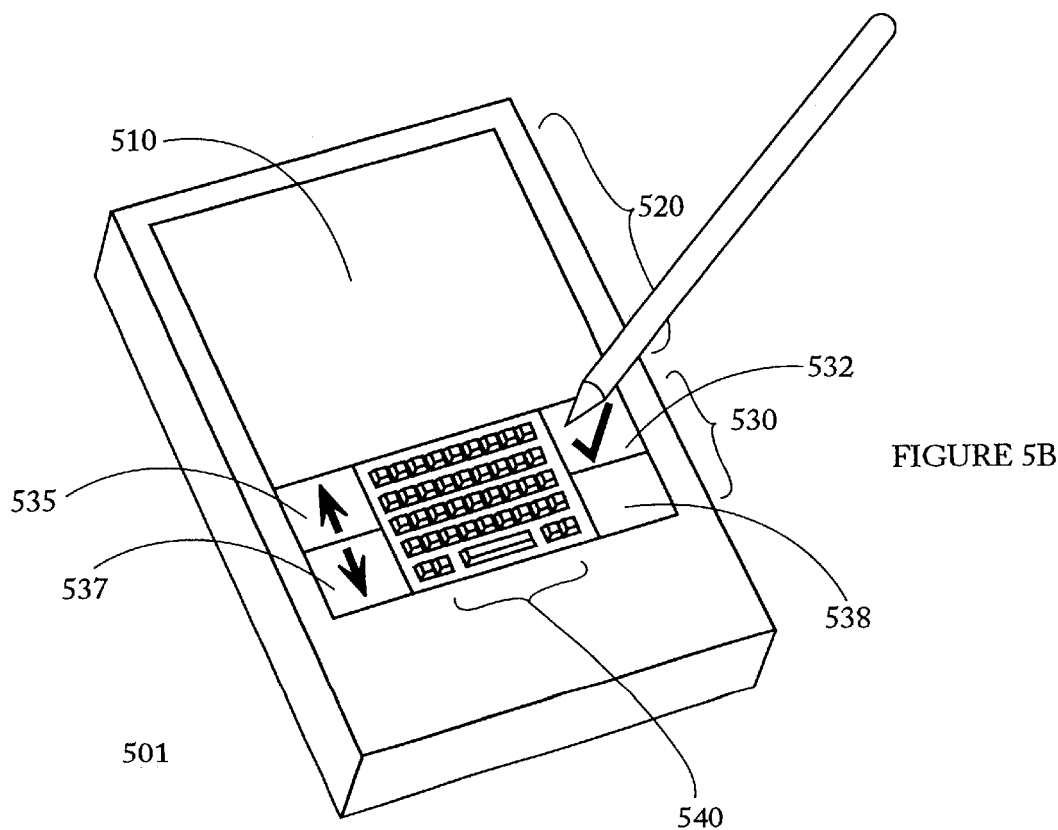

FIGS. 5a and 5b illustrate an external view of a first embodiment of a pen-based palmtop computer system constructed according to the teachings of the present invention. In the embodiment of FIG. 5, a small part of the display screen is designated as a permanent input area 530. The permanent input area 530 could be located anywhere on the palmtop computer system, but placing the permanent input area 530 below the screen display works best location since the user's hand will not obscure or touch the screen display when the user is writing into the permanent input area 530.

Some of the permanent input area 530 is used for function buttons such as buttons 532, 535, 537 and 538. The areas behind the function buttons can display icons symbolizing different functions that become available. The remainder of the permanent input area 530 is designated as a permanent text input area 540. The permanent text input area 540 normally displays a small box for inputting handwritten text as illustrated in FIG. 5a. However, if the user wants to enter text by tapping on a keyboard then a small keyboard can be displayed in the permanent text input area 540 as illustrated in FIG. 5b.

With the permanent text input area 540 always displayed in the same position on the display, the applications running on the palmtop computer system can always rely on having a well-defined output area on the display screen. The application never needs to resize itself to accommodate handwritten input. Furthermore, the application is never obscured by a handwriting input box.

The permanent text input area 540 is always available to an application running on the palmtop computer system such that the application can always receive text input and the user is presented with a consistent user interface. Since the permanent text input area 540 is always available, applications can be written such that the user can start writing before entering an editing mode. For example, while viewing a To-Do List in a To-Do List application, the application can automatically create a new To-Do list item if the user starts to write in the text input area. This shortcut feature enables a user to quickly enter information without having to traverse through a menu system.

As illustrated in FIGS. 5a and 5b, the permanent text input area of the present invention is not very large such that a user cannot write long lines of information into the permanent text input area. Therefore, the palmtop computer system of the present invention preferably uses a handwriting recognition system that provides immediate feedback to the user. For example, the permanent text input area may comprise two or more "character boxes" where each character box consists of a defined area of the permanent text input area. The user writes consecutive letters into different character boxes. When the user begins writing into a character box, the handwriting recognition system processes the character box that the user last wrote into. If there are two character boxes, then the user simply alternates between the two character boxes.

In a preferred embodiment, the handwriting recognition system used in the present invention comprises a system that allows the user to write consecutive characters on top of each other. Each character is immediately recognized after it is written. Thus, the permanent text input area only needs to be large enough for a user to write a single handwritten character. One example of a handwriting recognition system used that allows a user to write consecutive characters on top of each other is the Graffiti™ program by Palm Computing, Inc. of Los Altos, Calif. The techniques for implementing a handwriting recognition system that allows the user to write consecutive letters on top of each other are disclosed in the U.S. patent application entitled "Multiple Pen Stroke Character Set and Handwriting Recognition System With Immediate Response", filed Jul. 1, 1994, Ser. No. 08/270,025, and are hereby incorporated by reference.

An Alternative Embodiment

The flat panel display screens are usually the most expensive component of any palmtop computer system. Furthermore, flat panel display screens occupy a large amount of the space within the interior of a palmtop computer system. Thus, it would be desirable to reduce the size of a flat panel display screen on a palmtop computer system. In an alternate embodiment of the present invention, the size of the flat panel display screen is reduced such that the handwriting input area and the function buttons are not located on an area above the flat panel display screen. Instead, the digitizer pad extends beyond the flat panel display screen and the dedicated input area is located on the area of the digitizer pad that extends beyond the flat panel display screen such that no visual feedback is provided directly under the pen in that area.

Figure 6:
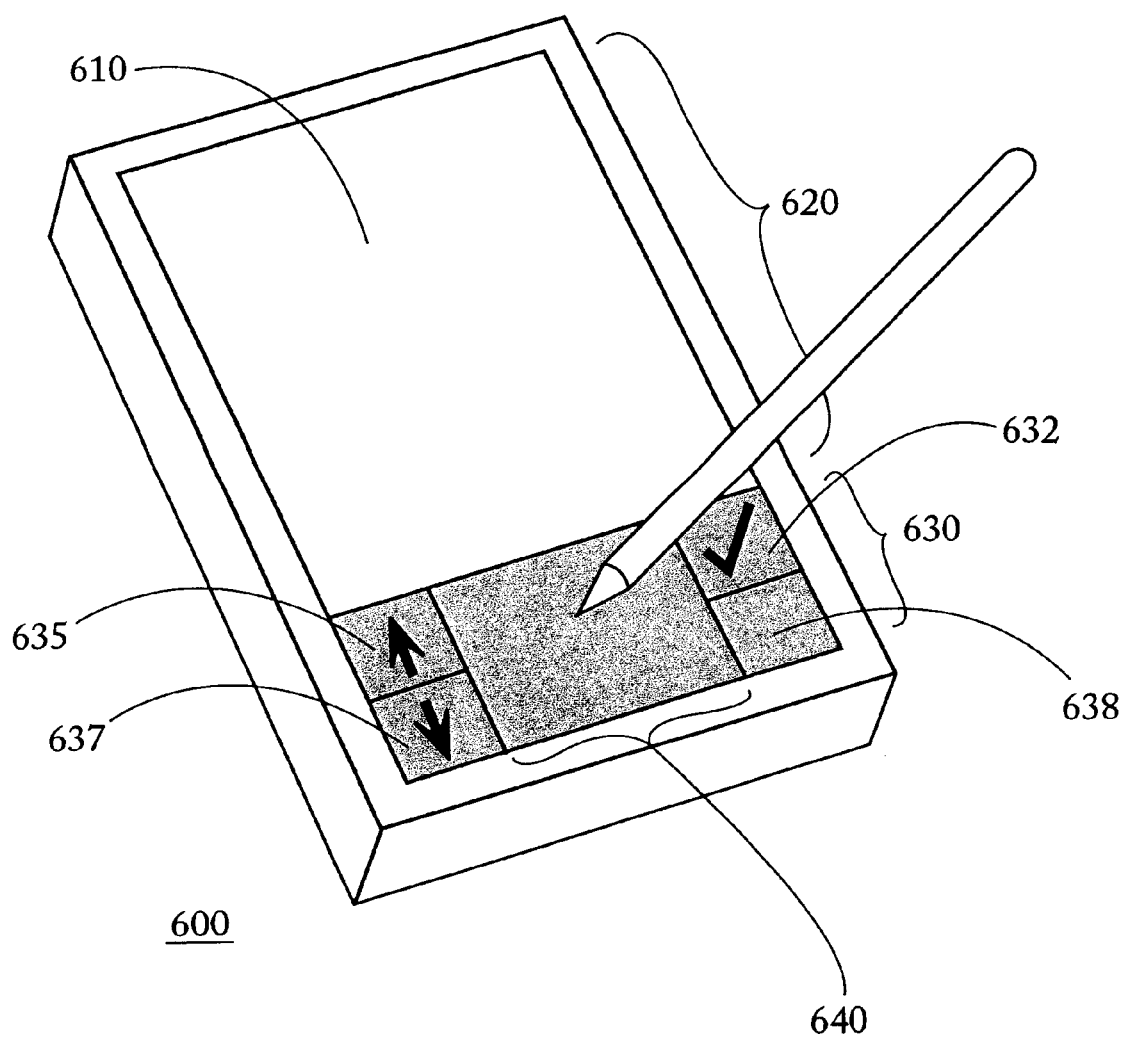
FIG. 6 illustrates a second embodiment of the pen-based computer system of the present invention.

FIG. 6 illustrates the alternate embodiment of the present invention. As illustrated in FIG. 6, the handwriting input area 640 and the function keys 632, 635, 637, and 638 form a permanent input area 630 that is located below the display screen area 620. The permanent input area 630 (the handwriting input area 640 and the function keys 632, 635, 637, and 638) are located on an active region of a digitizer pad that extends beyond the flat panel display screen such that the palmtop computer system can sense input from the user in the permanent input area 630.

Since the permanent input area 630 is not located above the display screen, no feedback in the form of "digital ink" will appear beneath the user's pen when the user writes in the permanent input area 630. However, tests with users have indicated that when using a handwriting recognition program such as Graffiti™ where consecutive characters are written on top of each other, the digital ink feedback is not necessary. Instead, the user is watching the display area 620 where the recognized character output from the user's handwriting is displayed.

To accommodate users that still desire having a keyboard to tap characters on, or for the occasional use of an on-screen keyboard to supplement handwriting recognition, the palmtop computer system of the present invention can still implement a pop-up keyboard in the display area. To view the pop-up keyboard, the user simply places the pen in text input area 630 and moves the pen up into the display area 620. This "input area to display area" gesture causes a small keyboard to appear in the display area. Alternatively, a keyboard design could be permanently printed in the text input area over the over the digitizer pad.

The second embodiment of the palmtop computer system of the present invention provides several additional benefits. The second palmtop embodiment of the present invention costs less to manufacture than the first embodiment since a smaller flat panel display is used. Since the flat panel display is the most expensive component in a palmtop computer system, this improvement can significantly reduce unit cost of a palmtop computer system constructed according to the teachings of the second embodiment.

Furthermore, the second embodiment of the palmtop computer system is more durable. The top surface of the digitizer pads used on palmtop computers can become scratched. Scratching can occur if a user does not write with the supplied pen or if the user writes hard for sustained periods of time. When a digitizer pad is located above the display area, the scratches on the digitizer pad can make the flat panel display difficult to read. In the second embodiment the permanent input area is not located over the display area and therefore, the digitizer pad area over display area is less likely to become scratched. Any scratches that do occur in the permanent input area do not affect the functionality of the unit and can be partially hidden by using colored printed material under the digitizer pad in the permanent input area as illustrated in FIG. 6.

Figure 7:
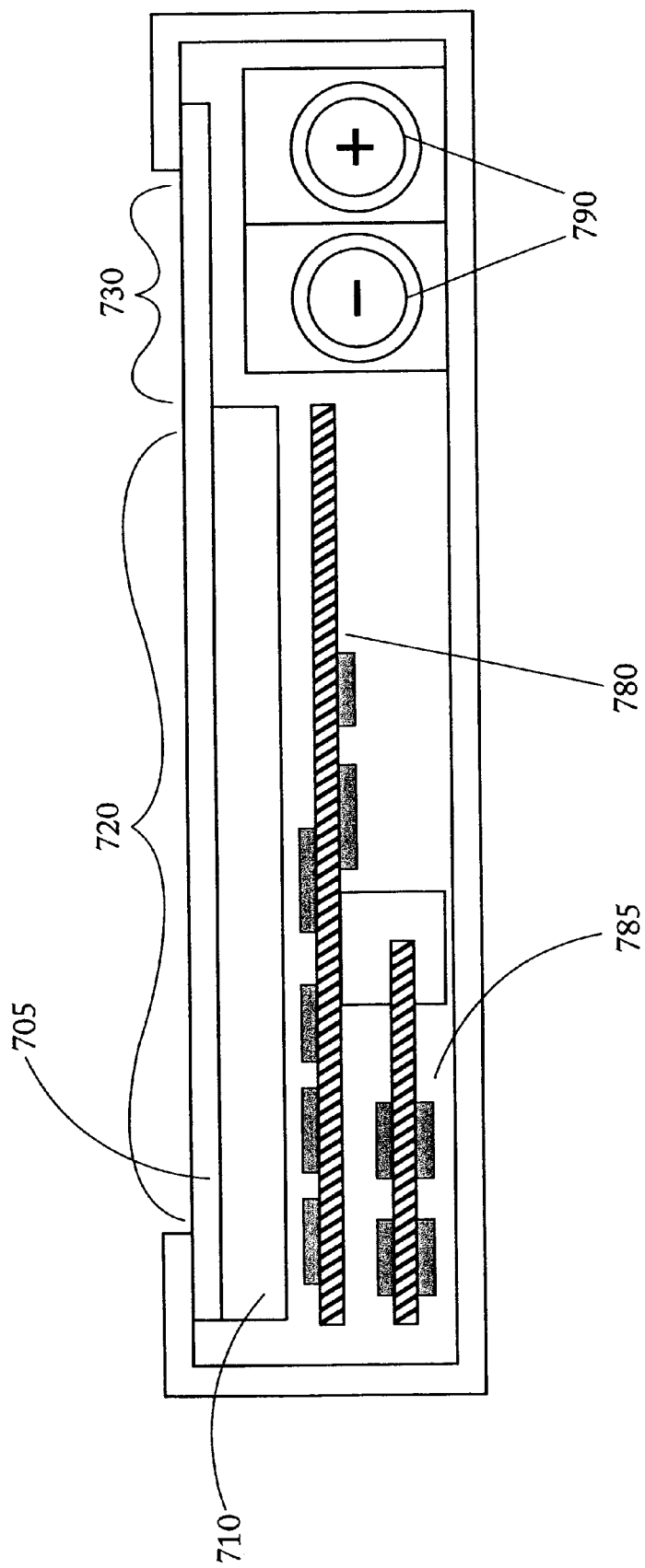
FIG. 7 illustrates a cross sectional view of the second embodiment of the pen-based computer system.

Finally, the second embodiment of the present invention provides additional internal space within the palmtop computer system. FIG. 7 illustrates a cross sectional side view of a palmtop computer system constructed according to the teachings of the second embodiment. As illustrated in FIG. 7, a digitizer pad 705 extends over the majority of the top surface of the palmtop computer. A flat panel display screen 710 lies beneath a portion of the digitizer pad 705. Note that the flat panel display screen 710 fills a significant amount of space inside the palmtop computer. Beneath the flat panel display screen 710 is a main logic board 780 and a daughter board 785.

Figure 8:
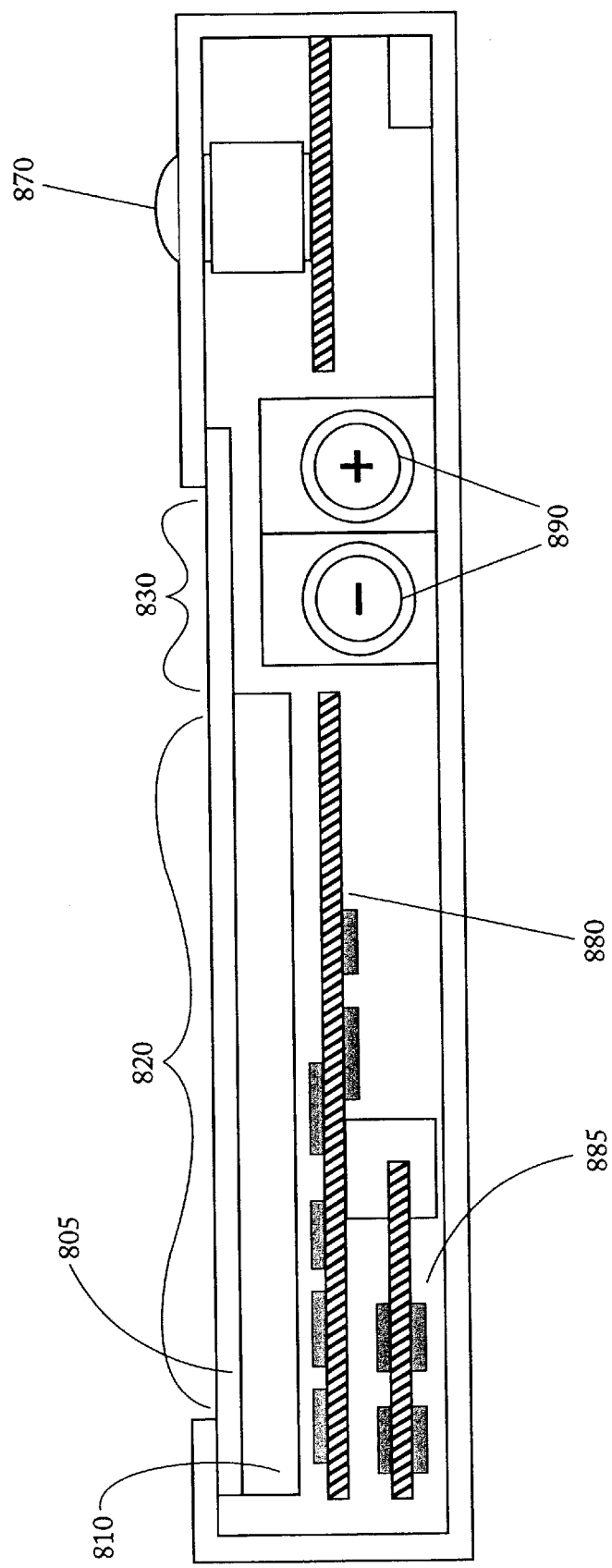
FIG. 8 illustrates a cross sectional view of a third embodiment of the pen-based computer system.

The digitizer pad 705 is divided into a display area 720 and the permanent input area 730. The display area 720 has flat panel display screen 710 beneath it. Since the permanent input area 730 does not have the flat panel display screen 710 beneath it, there is additional of space within the body of the palmtop computer system beneath the permanent input area 730. This space can be used to house large internal components for the palmtop computer system such as the batteries 790 as illustrated in FIG. 7. Conversely, most existing palmtop computer systems have a large unused surface area, such as area 250 in FIG. 2a, since a thick internal space is required to house some components. FIG. 8 illustrates another version of the second embodiment. In the version of FIG. 8, a row of push buttons is located at the bottom of the screen such that the palmtop computer system can easily be operated without using the accompanying pen.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A palmtop computer comprising:

a housing having a first surface, and a display assembly provided with the first surface of the housing, the display assembly comprising a digitizer coupled to a display screen, wherein relative to a cross-section of the housing that includes the first surface, the display assembly has a first thickness corresponding to the digitizer overlaying the display screen to provide an output area for the first surface of the housing, and a second thickness less than the first thickness and corresponding to the digitizer extending beyond the display screen to form a dedicated input area for the first surface of the housing, wherein the dedicated input area is adapted to receive input corresponding to one or more gestures made by contacting the dedicated input area wherein the dedicated input area includes at least two character boxes, the character boxes comprising subareas of the dedicated handwriting area, logical components of a logical board interpreting an input entered onto a first character box as a character from a first set of characters, the logical components of the logical board interpreting an input entered onto a second character box as character from a second set of character.

2. The palmtop computer of claim 1, further comprising a first logic board comprising logical components for interpreting gestures made onto the dedicated input area.

3. The palmtop computer of claim 1, wherein an internal space is formed within the housing adjacent to the first thickness and underneath the second thickness, the internal space providing for an internal component of the palmtop computer.

4. A palmtop computer apparatus comprising:

a display screen; and a display assembly comprising a display screen coupled to a digitizer pad, the digitizer pad overlaid on the display screen, wherein relative to a cross-section of the palmtop computer, the display assembly includes a first thickness corresponding to the digitizer overlaying the display screen and a second thickness less than the first thickness and corresponding to the digitizer extending beyond the display screen to form a dedicated input area, the dedicated input area being adapted to receive input corresponding to one or more characters made by contacting the dedicated input area;

a handwriting interpreter to interpret the input made by contacting the dedicated input area;

wherein the handwriting interpreter causes a virtual floating keyboard to be displayed on the display assembly upon receiving an input entered onto the dedicated input area.

5. The apparatus of claim 4 further comprising:

a first character box and a second character box, the first and second character boxes formed on the dedicated input area, the handwriting interpreter interpreting an input entered onto the first character box as a first character from a first set of characters, the handwriting interpreter interpreting an input entered onto the second character box as a second character from a second set of characters.

6. The apparatus of claim 5, further comprising logic to display characters from the first set of characters and the second set of characters automatically in response to the inputs being entered onto the first character box and the second character box.

7. The apparatus of claim 4 further comprising:

a dedicated function area also formed on a region of the display assembly corresponding to the digitizer extending beyond the display area, the dedicated function area comprising at least one function item that performs an associated function when selected.

8. The apparatus of claim 4 wherein said handwriting interpreter comprises a recognition system for automatically interpreting an input entered onto the dedicated input area.

9. The apparatus of claim 8 wherein the handwriting interpreter interprets a set of consecutively entered characters in a character entry box of the dedicated input area.

* * * * *

UNITED STATES PATENT AND TRADEMARK OFFICE
CERTIFICATE OF CORRECTION

PATENT NO. : 6,295,372 B1
DATED : September 25, 2001
INVENTOR(S) : Hawkins et al.

It is certified that error appears in the above-identified patent and that said Letters Patent is hereby corrected as shown below:

Column 8, claim 1,
Line 3, replace "area wherein" with -- area, wherein --.

Signed and Sealed this

Twelfth Day of March, 2002

Attest:

*Attesting Officer*

JAMES E. ROGAN
*Director of the United States Patent and Trademark Office*